United States Patent
Josse

(10) Patent No.: US 9,540,270 B2
(45) Date of Patent: Jan. 10, 2017

(54) ANAEROBIC TREATMENT OF INDUSTRIAL WASTEWATER

(71) Applicant: Anaergia Inc., Burlington (CA)

(72) Inventor: Juan Carlos Josse, Mission Viejo, CA (US)

(73) Assignee: Anaergia Inc., Burlington, CA (US)

( * ) Notice: Subject to any disclaimer, the term of this patent is extended or adjusted under 35 U.S.C. 154(b) by 557 days.

(21) Appl. No.: 13/832,258

(22) Filed: Mar. 15, 2013

(65) Prior Publication Data
US 2014/0131272 A1    May 15, 2014

Related U.S. Application Data

(60) Provisional application No. 61/725,842, filed on Nov. 13, 2012.

(51) Int. Cl.
| | |
|---|---|
| C02F 11/04 | (2006.01) |
| C02F 3/28 | (2006.01) |
| C02F 3/30 | (2006.01) |
| C02F 11/12 | (2006.01) |
| C02F 1/24 | (2006.01) |
| C02F 3/12 | (2006.01) |
| C02F 11/14 | (2006.01) |

(52) U.S. Cl.
CPC ............... *C02F 11/04* (2013.01); *C02F 1/24* (2013.01); *C02F 3/1273* (2013.01); *C02F 3/2853* (2013.01); *C02F 11/125* (2013.01); *C02F 11/14* (2013.01); *Y02W 10/15* (2015.05); *Y02W 10/23* (2015.05)

(58) Field of Classification Search
CPC ........... C02F 11/04; C02F 11/125; C02F 1/24; C02F 3/1273; C02F 3/2853; C02F 11/14
USPC .................................. 210/603, 605, 631
See application file for complete search history.

(56) References Cited

U.S. PATENT DOCUMENTS

| | | | |
|---|---|---|---|
| 7,267,774 B2 | 9/2007 | Peyton et al. | |
| 2010/0264081 A1* | 10/2010 | Suzuki et al. ................ | 210/605 |
| 2013/0277319 A1 | 10/2013 | Theodoulou et al. | |

FOREIGN PATENT DOCUMENTS

| | | |
|---|---|---|
| CA | 2641270 A1 | 12/2009 |
| CA | 2752747 A1 | 8/2010 |
| | (Continued) | |

OTHER PUBLICATIONS

The International Search Report of PCT/CA2013/050301, dated Jul. 18, 2013.

(Continued)

*Primary Examiner* — Fred Prince

(57) ABSTRACT

Feed water is processed in an anaerobic digester. A solid-liquid separation device, for example a sludge screw thickener, treats a stream drawn from the digester in a recirculation loop. The solids portion is returned to the digester to increase the solids retention time and the TSS concentration in the digester. A liquid portion with less than 5% of the solids in the stream is removed and optionally treated further. The flow rate to the solid-liquid separation device is preferably greater than the influent flow rate. The solid-liquid separation device may receive digestate at a TSS concentration of 4% or more and return a solids portion having a TSS concentration of over 10%. The feed water is preferably one or more industrial waste streams having a COD concentration of 20,000 to 50,000 mg/L and a TSS concentration from 1-5%. The organic loading rate may be 10-12 kg/COD/m3/day.

18 Claims, 4 Drawing Sheets

Process flow diagram for the wastewater treatment process

(56) References Cited

FOREIGN PATENT DOCUMENTS

| | | | |
|---|---|---|---|
| CA | 2807881 A1 | | 2/2012 |
| CN | 101781059 A | * | 7/2010 |
| JP | H04200899 A | | 7/1992 |
| JP | H06098513 B2 | | 12/1994 |
| JP | H06098517 B2 | | 12/1994 |
| JP | 2005279731 A | | 10/2005 |
| JP | 2010279976 A | | 12/2010 |
| WO | 2012103629 A1 | | 8/2012 |

OTHER PUBLICATIONS

International Search Report of PCT/CA2013/050297, dated Jul. 16, 2013.
English Abstract of JP 2005279731, dated Oct. 13, 2005.
English Abstract of JP H04200899, dated Jul. 21, 1992.
English Abstract of JP H06098513, dated Dec. 7, 1994.
English Abstract of JP H06098517, dated Dec. 7, 1994.
English Abstract of JP 2010279976, dated Dec. 16, 2010.
AnoxKaldnes MBBR biofilm technology, http:www.anoxkaldnes.com/news-resources/technology-information/mbbr.htm; printed Oct. 18, 2012.

* cited by examiner

Figure 1 - Process flow diagram for the wastewater treatment process

ANAEROBIC TREATMENT OF INDUSTRIAL WASTEWATER

RELATED APPLICATIONS

This application claims the benefit of U.S. Provisional Application No. 61/725,842 filed Nov. 13, 2012, which is hereby incorporated by reference.

FIELD

This specification relates to a process and apparatus for treating waste products, such as industrial wastewater or industrial solid waste, involving anaerobic digestion.

BACKGROUND

International Publication Number WO 2012/103629 A1, Anaerobic Fermentation to Produce Biogas, describes a process and apparatus for the anaerobic digestion of organic wastes, preferably to also produce a useful biogas. The waste may have a total solids (TS) concentration of 6% or less while a digester is operated at a higher solids concentration, for example with a feed TS concentration of 8-12%. One or more separation stages downstream of the digester separate active bacteria and undigested organics from the digestate, and return separated matter to the digester. Optionally, a feed thickening apparatus and step may be provided upstream of the digester. The upstream thickener and recycle from the downstream separation stages are operated such that the TS of the combined inputs to the digester is within a desired range.

INTRODUCTION

In a wastewater treatment system and process, feed water is processed in an anaerobic digester. A solid-liquid separation device, for example a sludge screw thickener (SST), treats digestate from the digester in a recirculation loop. The solids portion is returned to the digester to increase the solids retention time and the total suspended solids (TSS) concentration in the digester. Some solids are wasted from the digester to maintain a target solids retention time (SRT) or TSS in the digester. A liquid portion of the digestate, which controls the hydraulic retention time (HRT), is removed from the anaerobic digester through the solid-liquid separation device. Optionally, the liquid portion may be treated further. The flow rate to the solid-liquid separation device is preferably greater than the influent flow rate. The solid-liquid separation device may receive digestate at a TSS concentration of 4% or more and return a solids portion having a TSS concentration of over 10%. The feed water is preferably one or more industrial waste streams having a chemical oxygen demand (COD) concentration of about 20,000 to 50,000 mg/L and a TSS concentration of about 1-5%. The organic loading rate may be about 10-12 kg/COD/m3/day.

Without intending to be limited by theory, the system and process are believed to be effective at treating industrial wastewater due to a combination of factors. The soluble organic carbon is reduced quickly while the retention time of particulate organic carbon is increased by the solid-liquid separation device. The solids retention time is also sufficient to remove fats, oils and grease (FOG) which, if not immediately digested, return with the solids portion. Furthermore, active anaerobic bacteria are returned to the digester with the solids portion. Returning bacteria to the digester, in combination with influent containing a high concentration of soluble COD, allows the digester to have a high percentage of its solids as living bacteria. The digester can therefore operate at a high organic loading rate while still maintaining an acceptable food to microorganism ratio and digesting a high percentage of the influent COD. The rapid and extensive digestion is balanced by the solid-liquid separation device receiving digestate at an already significant initial TSS concentration and a flow rate greater than the influent flow rate, returning a solids portion thickened to at least twice the initial solids concentration, and losing less than 5% of the solids fed to it in the liquid portion.

DETAILED DESCRIPTION

Figure 1:
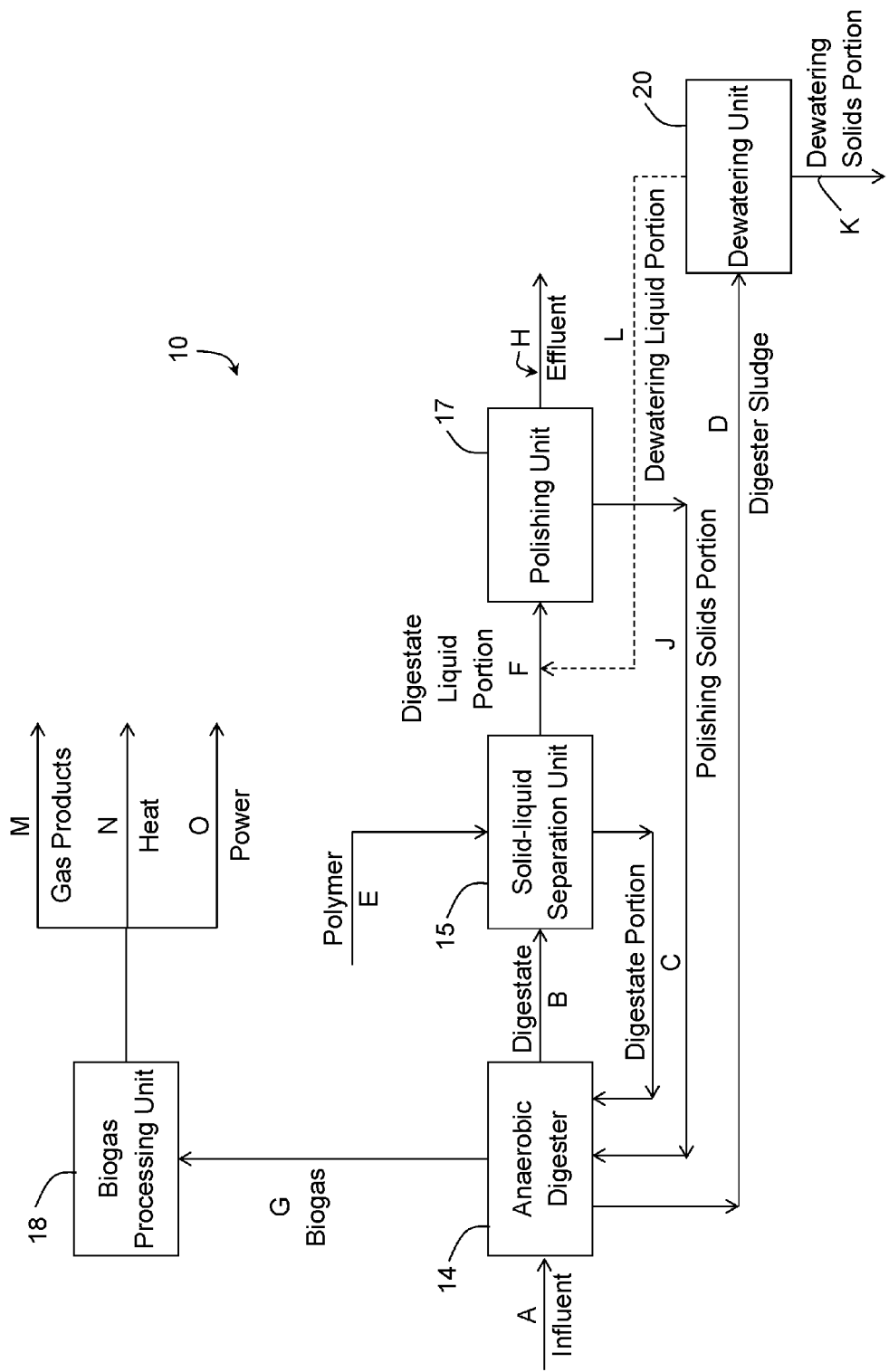
FIG. 1 is a schematic process flow diagram for a wastewater treatment system.

FIG. 1 shows a system 10 for treating wastewater. The system is primarily intended for treating industrial wastewater. Industrial wastewater tends to have a high chemical oxygen demand (COD), for example 20,000 to 50,000 ppm. A significant portion, for example 50% or more, of the COD may be soluble. The industrial wastewater might, or might not, also have a medium (typically 1-2%) or high (3-5%) total suspended solids (TSS). Industrial wastewater may also have a material concentration of fats, oil or grease (FOG), for example 300 to 4,000 mg/L or about 5 to 15% of the volatile solids (VS) in the industrial wastewater. Optionally, the system may treat a combination of an industrial waste solids stream and an industrial wastewater stream, the combination having characteristics as described above. The waste streams are treated primarily by anaerobic digestion. Optionally, effluent from the anaerobic digester may be subsequently treated with one or more physical, chemical or biological treatments.

In the system 10, influent A is treated in an anaerobic digester 14. Influent A preferably has characteristics described in the paragraph above. Influent A may be a single stream or a composite, whether mixed or not, of two or more waste streams. Digestate B, alternatively called effluent or sludge, is sent to a solid-liquid separation unit 15. The solid-liquid separation unit 15 separates the digestate B into a digestate solids portion C and a digestate liquid portion F. The digestate solids portion C is returned to the anaerobic digester 14. The digestate solids portion C includes suspended solids such as bacteria, non-digested solids and FOG. Returning the digestate solids portion C to the anaerobic digester 14 while removing some or all of the digestate liquid portion F results in the solids retention time (SRT) of the anaerobic digester 14 being higher than its hydraulic retention time (HRT). The total suspended solids (TSS) content of the anaerobic digester 14 is also higher compared to a digester with the same HRT without digestate solids portion C recycle.

The anaerobic digester 14 may be one of numerous vessels and configurations including but not limited to continuous stirred tank reactor (CSTR), plug flow reactor (PFR), suspended growth reactor, attached growth reactor or a combination thereof. CSTRs, which include mixed tank reactors generally, are preferred since they are reliable and inexpensive. However, conventional CSTRs with a 20-30 day HRT and SRT are often inefficient due to a low concentration of active biomass. Low concentrations of active biomass require low organic loading rates and large tank volumes due to the need to avoid bacteria washout and provide an adequate food to micro-organism (F/M) ratio. A low solids concentration in conventional digesters also limits the suspended solids concentration that can be tolerated in the influent A. However, the solid-liquid separation unit 15 decouples the SRT from the HRT. The result is an anaerobic digester 14 capable of handling high loading rates of soluble organics and medium loading rates of particulate organics while providing sufficient solids residence time for particulate solids and FOG to undergo hydrolysis, assimilation and degradation. Additionally, the solid-liquid separation unit 15 minimizes the risk of bacteria washout.

The digestate liquid portion F is not returned to the anaerobic digester 14 and may be disposed of. For example, the digestate liquid portion F may be sent to a sewer if permitted in a particular location. Optionally, the digestate liquid portion F may be treated further by one or more chemical, physical or biological treatments steps in a polishing unit 17. Some specific polishing options will be discussed below in relation to FIGS. 2 to 4. The polishing unit 17 produces an effluent H. The effluent H is preferably at least closer than digestate liquid portion F to meeting a desired standard for re-use or disposal of the effluent H. In some cases, the polishing unit 17 may also produce a solids stream or sludge, which is referred to generically in FIG. 1 as polishing solids portion J. Preferably, the polishing solids portion J is returned to the anaerobic digester 14. Alternatively, the polishing solids portion J may be sent to a dewatering unit 20, or treated or disposed of by other methods.

A digester sludge D is also removed from the anaerobic digester 14. The digester sludge D may be removed periodically, for example once a day, or continuously. The digester sludge D may be removed from a separate outlet or from a branch of a line carrying the digestate B. The digester sludge D is sent to a dewatering unit 20, for example a screw press, a centrifuge, a belt filter press or a plate and frame press. The dewatering unit 20 produces a dewatering liquid portion L and a dewatering solids portion K. The dewatering liquid portion L may be disposed of or treated in the system 10 or another facility. For example, the dewatering liquid portion L may optionally be treated in the polishing unit 17, if any. The dewatering solids portion K is removed from the system 10.

The dewatering solids portion K is typically dried further to produce a cake that is taken, for example, to a landfill, to a composting facility, or to an incinerator. The dewatering solids portion K contains some solids from the influent A that are inert or volatile but difficult to digest in the anaerobic digester 14 in any reasonable SRT, and also excess biomass produced in the anaerobic digester 14. Removing the digester sludge D, and in particular the dewatering liquid portion K, limits the concentration of inert or difficult to digest solids and biomass in the anaerobic digester 14. Removing the digester sludge D also provides the primary control of solids retention time (SRT) and solids concentration in the anaerobic digester 14 since solids in the digestate B are mostly recycled to the anaerobic digester 14. The amount of digester sludge D removed is such that the solids removed balance backwash yield and non-volativle suspended solids entering the anaerobic digester 14. The bacterial yield is typically about 8 to 10% of the COD removed in the anaerobic digester 14.

Optionally, a side stream from the digestate solids portion C may be removed from the system 10 in place of, or as a supplement to, removing digester sludge D. In this case, the flow of digestate B to the solid-liquid separation unit 15 is increased by the amount of digestate B that would have been removed in digester sludge D. The solid-liquid separation unit 15 handles a larger flow than when digester sludge D is removed directly from the anaerobic digester 14. The digestate solids portion C is difficult to mix with a polymer, which is required for some types of dewatering unit 20 such as a centrifuge. However, a sidestream from the digestate solids portion C may be dewatered in a plate and frame press, for example, without adding a polymer. Further, although it is usually desirable to remove solids in the form of a dry cake, in some cases waste solids may be used without extensive dewatering, for example by application to agricultural land. In these cases, dewatering unit 20 may be omitted and solids can be removed from the system 10 through digester sludge D, a sidestream from the digestate solids portion C, or from both.

The polishing solids portion J, if any, may also be removed from the system 10. However, the polishing solids portion J is typically a small stream with a low concentration of anaerobic microorganisms, and solids that are mostly digestible. Accordingly, removing solids with the polishing solids portion J might be accounted for but is not likely to replace removing the dewatering solids portion K. The polishing solids portion J is preferably returned to the anaerobic digester 14 since it increases biogas production and reduces the amount of solids to be disposed of.

Biogas G is produced in the anaerobic digester 14. The biogas G may be flared but it is preferably sent to a biogas processing unit 18 to produce one or more of gas products M, heat N or power O. The biogas processing unit 18 may include one or more treatment units to upgrade the biogas G. For example, the biogas G may be treated to remove water vapour, particulates, ammonia or carbon dioxide. The biogas G may be upgraded further for injection into a natural gas pipeline, or otherwise as a replacement for natural gas. Alternatively, the biogas G may be burned on site to create heat, electricity or both. For example, the biogas G may be burned in a turbine of a combined heat and power unit. Heat produced from the biogas G may be used in the system 10, for example to heat the anaerobic digester 14 or to help dry the dewatering solids portion K to a cake. Electricity produced from the biogas G may be used in the system, for example to power pumps or mixers in the anaerobic digester 14.

The anaerobic digester 14 typically comprises one or more tanks, in series or in parallel or both, with mixers. Mixing in the digester tank is affected by the solids content and viscosity of the digestate in the tank. For example, increasing the solids content from 2.5% to 5% will usually result in a ten-fold increase in viscosity. The anaerobic digester 14 is preferably operated at a total solids (TS) content of 4 to 7%, or 5 to 6%. Operating at a 5 to 6% TS content results in a viscosity of 5 to 7 Pa·s (5,000 to 7,000 cP). Digestate with this viscosity cannot be properly mixed with common mixing systems such as top entry, jet, draft tube, linear or gas mixers. The high viscosity and operating temperature (about 38 degrees C. if mesophilic or about 55 degrees C. if thermophilic) also makes electric submersible mixers inadequate as the electric motors tend to overheat.

Installing electrical equipment inside a digester tank may also create risks of explosion associated with biogas in the headspace.

Mixing is preferably done with high torque, low speed submersible mixers. UTS Products GmbH in Lippetal, Germany manufactures high solids content submersible mixers driven by a hydraulic motor that are typically used for agricultural or industrial solids digesters. These mixers are controlled through service boxes. The service boxes have a retractable skirt designed to isolate the service box from the digester tank headspace. This allows safe mixer servicing without the need to empty the digester tank or stop operation. The service boxes are installed in the digester cover, one on top of each mixer column guide, to access the mixers for service and to enable repositioning or removal of the mixers. Fixed digester covers or double membrane covers are preferred when using the service boxes. Each mixer uses a 22 kW external hydraulic power unit and circulates biodegradable hydraulic oil. If leaks occur inside the digester then the bacteria can degrade the non-toxic leaked oil.

Usually two or more mixers are needed per digester tank, depending on the digester tank dimensions. The mixers are located near the tank perimeter and directed to create a rotational movement of the digestate and also to reintroduce floating layers or crusts back into the bulk of the digestate. The UTS hydraulic power units have the ability to drive up to 5 mixers. The mixers have automatic rotation reversal if a sudden torque increase is detected, which could be attributed to rags or an accumulation of hair or other fibers in the mixer blades. The vertical supporting columns of the mixers allow flexibility in directing and positioning the mixers so that the mixing energy can be effectively used.

Mixing is done intermittently, usually 20% of the time. Typical mixing intervals are 10 minutes ON and 40 minutes OFF, although other cycles can be used. Continuous mixing is unnecessary and more energy consuming. Further, propionate inhibition can occur with constant mixing in both mesophilic and thermophilic digesters.

The anaerobic digester 14 contains microorganisms, primarily bacteria, to digest the influent A to produce biogas G and digestate B. The anaerobic digester 14 is operated at about a 4 to 7%, preferably 5-6%, TSS content. The digestate B has about the same solids content as the tank of the anaerobic digester 14. Preferred HRT and SRT depend on the degradability of the influent A, SRT is typically over 25 days. The HRT can be as short as 3 hours for mostly soluble COD or up to 3 days for influent A with high TSS content.

The anaerobic digester 14 is preferably heated to maintain the temperature in a mesophilic or thermophilic range. Heating may be done using a recirculating sludge loop from the anaerobic digester, into a heat exchanger, and back to the anaerobic digester 14. External tube-in-tube or double spiral heat exchangers may be used. Due to the viscosity of the digestate, tube-in-tube exchangers require large passages to reduce head losses and facilitate cleaning, and also require internal static flow deflectors in the sludge side to promote sludge turbulence and increase heat transfer efficiency. This type of tube-in-tube exchanger is available from a few manufacturers and is preferred over spiral exchangers, which usually are more costly and have higher friction losses. The recirculating loop uses a positive displacement pump operated with continuous or intermittent pumping. The recirculating loop preferably has an in line grinder to reduce the risk of a heat exchanger plugging with rags or fibers.

The digestate may be pumped continuously through the heat exchanger while hot water is pumped through the exchanger as needed to maintain the desired temperature. In this case, temperature control is done on the hot water side of the heat exchanger, automatically introducing new hot water when needed by means of a temperature control valve. Hot water from a boiler or waste heat from burning biogas G may be used to heat the digestate. A heat pump may also be used to recover some heat from the digestate liquid portion F if it is not useful for a polishing treatment.

The solid-liquid separation unit 15 operates at about at a TSS recovery of 90% or more, preferably 95% or more. Since the digestate solids portion C returned to the anaerobic digester 14 adds to the influent flow and must be passed back through the solid liquid separation unit 15, it is beneficial to maximize the thickening ratio of the solid liquid separation unit 15. Maximizing the thickening ration of the digestate solids portion C also reduces the rate of polymer consumption in the solid liquid separation unit 15. Polymer consumption is a function of the solids mass loading (flow rate multiplied by solids concentration) that the solid liquid separation unit 15 receives. Flow rate of digestate, and therefore solids mass loading, are reduced as thickening ratio increases. Increasing the thickening ratio also reduces the size of the solid liquid separation unit 15, which is also a function of solids mass loading. However, it is not desirable to have to move the digestate solids portion C on a conveyor as a cake. Accordingly, the digestate solids portion C is preferably thickened to near the highest concentration that may be pumped back to the anaerobic digester 14.

The TSS of the digestate solids portion C may be 2 to 3 times or more than the TS of the digestate B. The TSS of the digestate solids portion C in the system 10 may be over 10%, preferably 12 to 14%. For example, digestate B at 4 wt % solids may be thickened to produce a digestate solids portion C at 12 wt %. The rate of flow of digestate B to the solid-liquid separation unit 15 is preferably at least as much as the flow rate (Q) of the influent A. Preferably, the rate of flow of digestate B to the solid-liquid separation unit 15 is at least 110% of Q or at least 120% of Q.

The solid-liquid separation unit 15 may be a drum, disc, or screw thickener (alternatively called a screw press). Other devices, such as clarifiers, dissolved or cavitation air flotation units, centrifuge thickeners, and membranes, are not useful for producing a digestate solids portion C with over 6% solids.

The solid-liquid separation unit 15 may have a screen or mesh having an opening size in the range of about 200 to 500 microns. Digestate B is pumped, for example with a positive displacement pump, from the anaerobic digester 14 to the solid-liquid separation unit 15. An in-line grinder can be installed in the pipe feeding the solid-liquid separation unit 15 in cases where the influent A contains fibers or large pieces. Digestate solids portion C, for example at 12% to 14% solids, is sent back to the anaerobic digester 14. For example, digestate solids portion C may drop from the solid-liquid separation unit 15 into a hopper-fed positive displacement pump such as a rotary lobe or progressive cavity pump.

Solids recovery is enhanced by adding a polymer to the digestate B to the solid-liquid separation unit 15. For example, Polymer E, typically in the form of a dilute solution, may be injected upstream of the solid-liquid separation unit 15. A high shear static mixer or mixing valve is used to disperse the polymer E into the digestate B. Flocculation is done in the pipe between the pump and the solid-liquid separation unit 15 as the digestate B and polymer E approach the solid-liquid separation unit 15. Typical polymer doses range from 4 to 6 kg per ton of solids.

A preferred solid liquid separation unit 15 is an enclosed rotary screw thickener with an internal screw, designed to receive sludge with high initial solids content (3 to 7%). A suitable screw thickener is described in U.S. Provisional Patent Application 61/636,000. U.S. Provisional Patent Application 61/636,000 is incorporated by reference. Such a screw thickener has an auger shaft within a screening section, the auger shaft US having an increased diameter towards an outlet end of the screw press. The screening section has openings sized to remove floc from sludge, for example 200 to 500 microns or wedgewire with a slot opening in the range from about 0.25 mm to about 0.75 mm. The screening section may be selectively fixed or allowed to rotate. A sprayer system can be used to spray water against the outside of the screening section. The screening section is cleaned periodically by spraying water against the screening section while rotating it. The screening section is enclosed.

A screw thickener generally as described in U.S. Provisional Patent Application 61/636,000 is available commercially from UTS. This thickener is enclosed, uses low energy, has low polymer demand and achieves high solids capture. It is designed to receive up to 5 to7% solids influent and to produce a 12 to 14% solids digestate solids portion C.

A rotary drum thickener might also be used, but is less desirable. In these, a screen drum rotates with internal welded flights moving the sludge forward as it drains. Some commercially available models can produce a solids content of 8 to 10%, but a solids content in the digestate solids portion C of over 10%, or over 12% is preferred. Rotary drum thickeners are also typically limited to a solids concentration of the digestate D of 3% or less which would prevent operating the anaerobic digester 14 at the preferred solids content of 4 to 7%. Rotary drum thickeners are also less efficient than rotary screw thickeners and are rarely enclosed. An enclosed device is preferred for odor control, since ammonia and hydrogen sulfide would otherwise escape to the atmosphere. Thickening centrifuges can also be used, but these are more costly than screw thickeners and require more energy to operate.

The anaerobic digester 14 may operate, for example, at 5% solids with a return of digestate solids portion C thickened to 12-14% solids. Since the solid-liquid separation device 15 returns most of the living bacteria, and the soluble fraction of the influent A promotes rapid bacteria growth, a significant portion of the solids in the anaerobic digester 14 is living bacteria. The F/M ratio can therefore be high relative to standards based on the digester solids content. The anaerobic digester 14 may operate with an organic loading rate (OLR) of about 10-12 kg COD/m3-day. The loading rate of particulate COD can be up to 7 kg COD/m3-d.

Ammonia is produced in the anaerobic digester from organic nitrogen being mineralized to ammonia. Alkalinity may need to be added to the anaerobic digester 14 to allow operation with ammonia in the digestate.

Digestate liquid portion F may have various contaminants, in particular TSS, COD and ammonia. The TSS concentration is typically in the range of 1,000 to 3,000 mg/L. If the digestate liquid portion F cannot be discharged, for example to a sewer, it may be treated first in the polishing unit 17. Some examples of polishing units 17 are shown in FIGS. 2 to 4.

Figure 2:
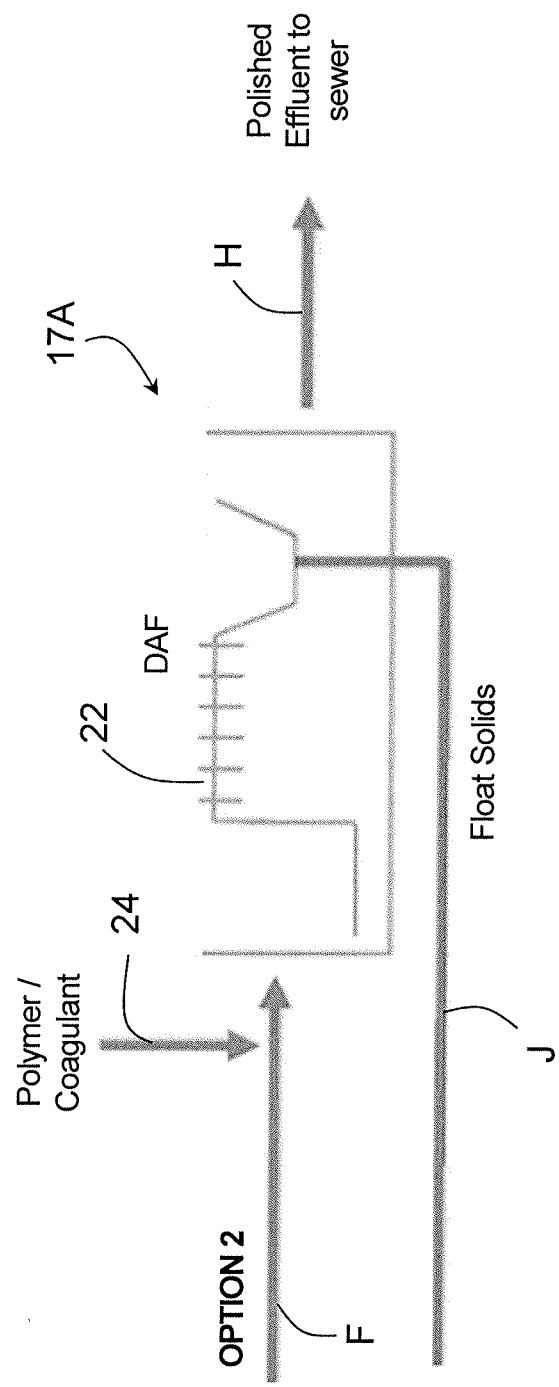
FIG. 2 is a schematic process flow diagram for a first further treatment option for the system of FIG. 1.

In FIG. 2, a first polishing unit 17A has a dissolved air flotation unit 22. The dissolved air flotation unit 22 is effective primarily to reduce the suspended solids concentration of the digestate liquid portion F. Chemicals 24, for example one or more of a coagulant and a polymer, may be added to the digestate liquid portion F. The chemicals 24 help create a floc that floats with micro-bubbles in the dissolved air flotation unit. Solids are recovered in the float and may be returned to the anaerobic digester 14 as polishing solids portion J. The effluent H left after the float is removed still contains COD and ammonia but is suitable for discharge to a sewer in many places. A cavitation air flotation device may be used with chemicals 24 in a similar way. Alternatively, tubular cross flow membranes may also be used to remove suspended solids from the digestate liquid portion F without the use of chemicals 24.

Figure 3:
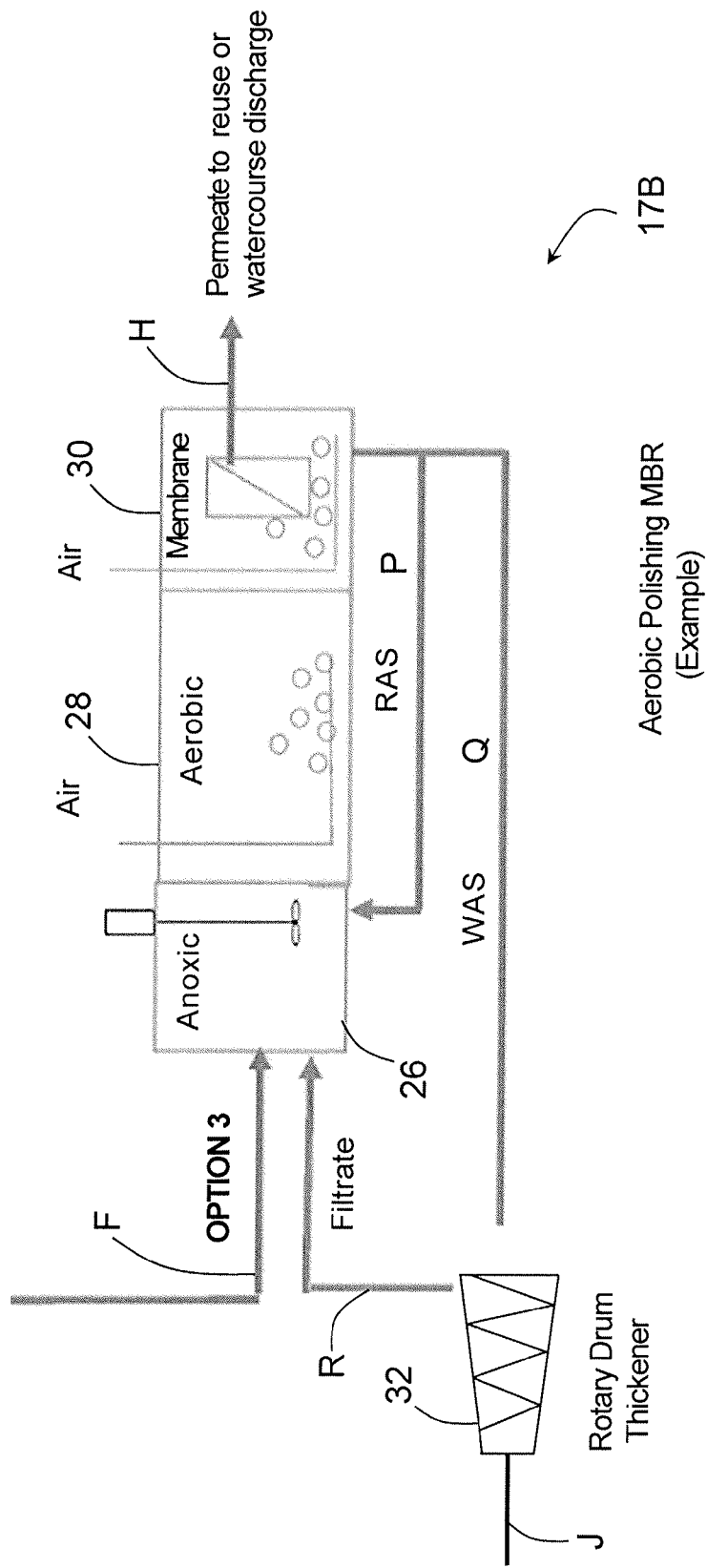
FIG. 3 is a schematic process flow diagram for a second further treatment option for the system of FIG. 1.

In FIG. 3, a second polishing unit 17B provides biological nutrient removal. If there is a requirement for high quality effluent H for discharge to a water course or for reuse, then it is usually necessary to remove nitrogen, COD and suspended solids with aerobic biological treatment. Aerobic treatment could be by a conventional activated sludge system with nitrogen removal, a membrane bioreactor, or an attached growth system. The second polishing unit 17B shown is a membrane bioreactor having an anoxic tank 26, an aerobic tank 28 and an aerobic membrane tank 30. Alternatively, a clarifier could be substituted for the aerobic membrane tank 30 to create a conventional activated sludge process, optionally with a downstream tertiary filter. Return activated sludge (RAS) is recycled from the separation tank 30 to the anoxic tank 26. Waste activated sludge (WAS) is taken from the separation tank 30 to a rotary drum thickener 32. Filtrate R from the rotary drum thickener 32 is sent to the anoxic tank 26. The recycle through the anoxic tank 26 and aerobic tank 28 removes nitrogen by way of a nitrification—denitrification process. Thickened WAS from the rotary drum thickener 32 may be returned to the anaerobic digester 14 as polishing solids portion J.

Figure 4:
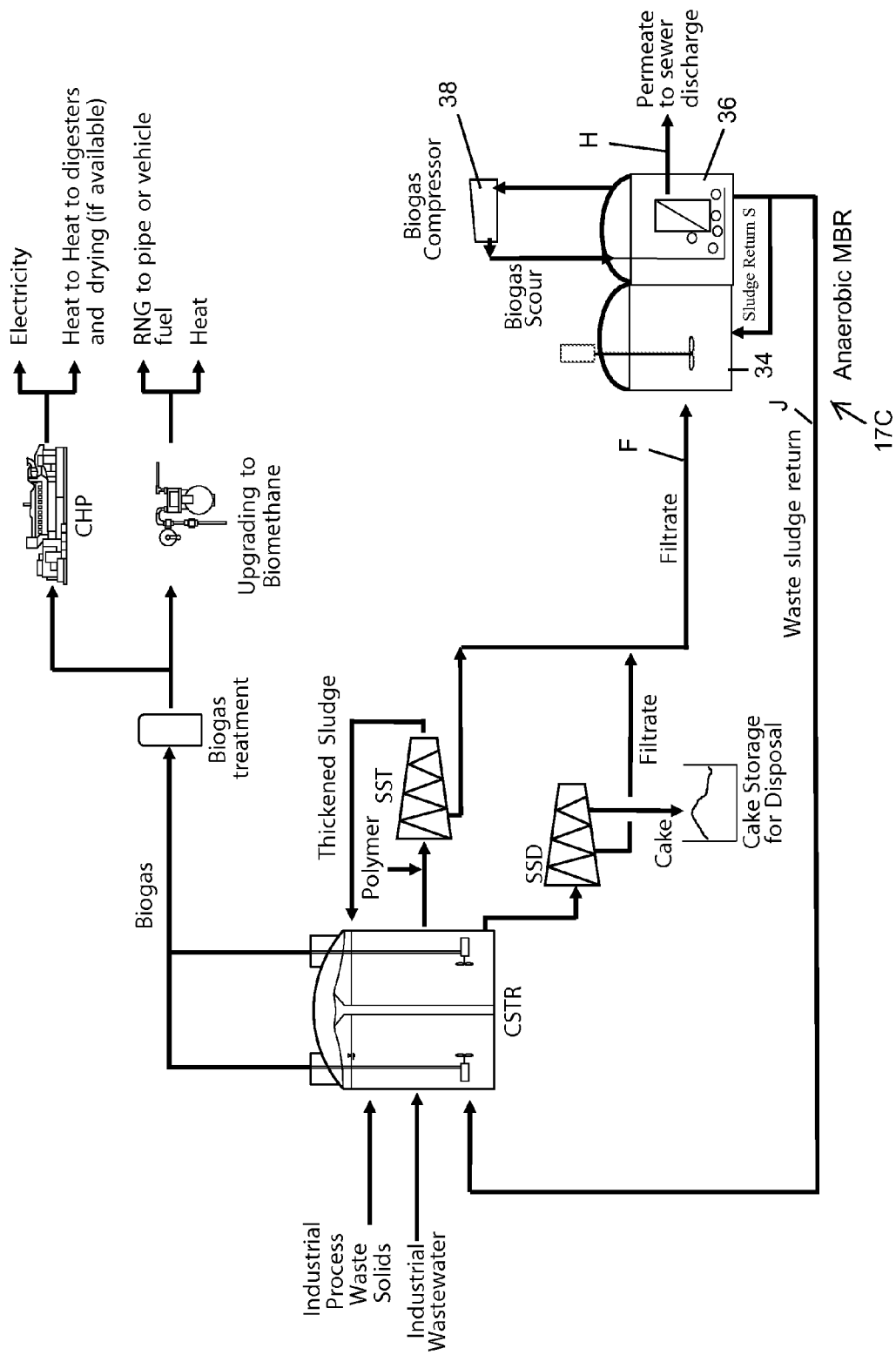
FIG. 4 is a schematic process flow diagram for a first further treatment option for the system of FIG. 1.

In FIG. 4, a third polishing unit 17C comprises an anaerobic membrane bioreactor. Digestate liquid portion F is received in a mixing tank 34 and then passes to a membrane tank 36. Both tanks 34, 36 are covered. A biogas compressor 38 recirculates biogas to a membrane unit in the membrane tank 36. Return sludge S flows from the membrane tank 36 to the mixing tank 34. The mixing tank 34 allows the membrane tank to operate without over concentrating. The flow rate of return sludge S may be about 3 or 4 times the flow rate of the digestate liquid portion F. For example, the membrane tank might operate at a mixed liquor suspended solids (MLSS) concentration of about 8,000 mg/L while the mixing tank has an MLSS of about 6,000 mg/L. A portion of the return sludge S is removed as waste sludge and returned to the anaerobic digester 14 as polishing solids portion J. The third polishing unit 17C removes colloidal solids due to the membrane filter. However, because an aerobic biomass is not generated, the membrane surface area and aeration energy required are much lower than for the second polishing unit 17B. Removing colloidal solids provides increased reduction in TSS and measured COD relative to the first polishing unit 17A but the ammonia concentration is not significantly reduced. Optionally, an ammonia stripper may be added to the third polishing unit 17C to recover ammonia for reuse.

In comparison, industrial wastewater with a (COD) of 20,000 to 50,000 ppm and up to 1.5% solids could be treated with a DAF unit followed by an anaerobic granular sludge reactor. The DAF unit thickens the wastewater to about 4% solids for feeding to the granular reactor. However, raw industrial wastewater at 4% solids is not typically fed to granular reactors. Raw wastewater at more than about 2% solids tends to have larger solid particles and FOG which are not tolerated by granular reactors and would need to be removed in upstream processes. Removed solids and grease have to be hauled off from industries and do not contribute to the biogas and energy generated. Accordingly, the system 10 is able to receive and treat a wider range of industrial wastes. The system 10 also avoids some operational difficulties with granular sludge systems, such as slow start up and seeding procedures, and avoids the risk of washing out suspended granular biomass.

In a modelling exercise, the system 10 was compared to a system having a DAF unit followed by an expanded granular sludge bed (EGSB) reactor. The influent was assumed to be a 0.5 MGD flow of industrial wastewater having 22,800 mg/L tCOD; 10,800 mg/L sCOD; and 10,000 mg/L (1%) TSS. Capital costs for the systems were similar, although the system 10 was about 5% less expensive. The operating cost of the system 10 was over 40% less than the operating cost of the DAF-EGSB system. The cost savings were due in large part to a reduction in solids disposal costs. Although not factored into the operating costs, the system 10 also produced more than twice as much biogas as the DAF-EGSB system. The biogas could be sold or used within the system 10 to further reduce the operating cost and energy consumption of the system 10.

In the description above, the terms solids portion and liquid portion indicate the higher solids content and lower solids content, respectively, of two streams produced from a solid-liquid separation device. The solids portion still contains some liquid, and the liquid portion still contains some solids. Depending on the particular solid-liquid separation device used, the solids portion might be called screenings, cake, retentate, reject, thickened solids, sludge, bottoms or by other terms. The liquid portion might be called effluent, permeate, filtrate, centrate or by other terms.

The word "digestate" is sometimes used in the art to refer specifically to the liquid portion of an effluent stream taken from an anaerobic digester. In this specification, however, digestate B is used to refer to a stream drawn from a digester before it is separated. Parts of this specification also relate to anaerobic digesters in the form of mixed tanks or CSTRs. In these cases, the word digestate is also used to refer to the entire mixed contents of the tank and digestate B withdrawn from the tank is similar in composition to digestate in the tank.

Unless stated otherwise or apparent form the context, solids contents or concentrations mentioned in this specification are total suspended solids (TSS). In digestate, the total solids (TS) is approximately the same as dried solids (DS) and roughly 10% higher than total suspended solids (TSS). For example, a 5% DS digestate may have 46,000 mg/L of TSS and 4000 mg/L total dissolved solids (TDS). Accordingly, solids contents or concentrations of one type given in this specification can generally be substituted with TS or DS concentrations without causing a material difference in the process.

The descriptions of processes and apparatus above are to provide at least one example of an embodiment within each claim but not to limit or define any claim. However, it is possible that a particular process or apparatus described above is not within a specific claim. Process parameters are given as examples of how a system may be operated and are not meant to limit a claim unless explicitly recited in a claim. Other processes for similar applications might operate at parameters within ranges that are 50% or 100% larger in both directions than the parameter ranges described above, or within a 50% or 100% variation from a single parameter described above. If one or more elements or steps described above are used to treat other wastes or under other conditions, then one or more process ranges described above might not be suitable and would be substituted with other appropriate parameters. Various sub sets of the unit processes described in relation to system 10 can be used in other treatment plants. Various sub sets of unit processes in the system 10 described above may also be combined in ways other than those described to produce different systems. Words such as "may", "preferable" or "typical", or variations of them in the description above, indicate that a process step or apparatus element is possible, preferable or typical, according to the word used, but still optional and not necessarily part of any claimed invention unless explicitly included in a claim.

We claim:

1. A method for treating wastewater comprising steps of,
   a) feeding an influent having a total suspended solids concentration of about 1-5% at a flow rate Q to an anaerobic digester;
   b) feeding a mixture from the anaerobic digester a flow rate of Q or more to a solid liquid separation device;
   c) separating the mixture into a liquid portion and a solids portion; and,
   d) returning at least most of the solids portion to the anaerobic digester.

2. The method of claim 1 wherein the solid liquid separation device is a screw thickener.

3. The method of claim 1 wherein substantially all of the solids portion is returned to the anaerobic digester.

4. The method of claim 1 wherein the anaerobic digester has a TSS concentration of 4 to 7%.

5. The method of claim 1 wherein the solids portion has a TSS concentration of over 10%.

6. The method of claim 1 wherein the solids portion has a TSS concentration of over 12%.

7. The method of claim 1 wherein the solids portion has a TSS concentration in the range of 12-14%.

8. The method of claim 1 wherein the organic loading rate of the anaerobic digester is at least 10 kg/COD/m3/day.

9. The method of claim 1 wherein the influent has a chemical oxygen demand concentration of about 20,000 to 50,000 mg/L.

10. The method of claim 1 wherein the solids portion contains 95% or more of the suspended solids in the mixture.

11. The method of claim 1 wherein the solids portion has a TSS concentration that is at least twice the TSS concentration of the mixture.

12. The method of claim 1 further comprising a step of treating the liquid portion in a second solid liquid separation device.

13. The method of claim 12 wherein the second solid liquid separation device is selected from the group consisting of a dissolved air flotation unit, a cavitation air flotation unit, and a tubular membrane.

14. The method of claim 12 wherein the second solid liquid separation device is a dissolved air flotation unit.

15. The method of claim 1 further comprising a step of treating the liquid portion in an activated sludge reactor.

16. The method of claim 15 wherein the activated sludge reactor is a membrane bioreactor.

17. The method of claim 1 further comprising a step of treating the liquid portion in an anaerobic membrane bioreactor.

18. The method of claim 1 further comprising a step of adding a polymer to the mixture.

* * * * *